United States Patent
Wang et al.

(10) Patent No.: US 10,967,730 B2
(45) Date of Patent: Apr. 6, 2021

(54) METHOD FOR SWITCHING MODES OF ELECTROMECHANICAL TRANSMISSION SYSTEM

(71) Applicants: Beijing Institute of Technology, Beijing (CN); Baotou Sansi Technology Development Co., Ltd., Inner Mongolia (CN)

(72) Inventors: Weida Wang, Beijing (CN); Changle Xiang, Beijing (CN); Yue Ma, Beijing (CN); Shaoping Lv, Inner Mongolia (CN); Lili Xu, Beijing (CN)

(73) Assignees: Beijing Institute of Technology, Beijing (CN); Baotou Sansi Technology Development Co., Ltd., Inner Mongolia (CN)

( * ) Notice: Subject to any disclaimer, the term of this patent is extended or adjusted under 35 U.S.C. 154(b) by 0 days.

(21) Appl. No.: 16/808,841

(22) Filed: Mar. 4, 2020

(65) Prior Publication Data

US 2021/0031613 A1    Feb. 4, 2021

(30) Foreign Application Priority Data

Aug. 1, 2019    (CN) .......................... 201910699050.6

(51) Int. Cl.
| | |
|---|---|
| *B60K 6/543* | (2007.10) |
| *B60K 6/365* | (2007.10) |
| *B60W 30/182* | (2020.01) |
| *F16H 3/62* | (2006.01) |
| *B60K 6/442* | (2007.10) |

(52) U.S. Cl.
CPC .............. *B60K 6/543* (2013.01); *B60K 6/365* (2013.01); *B60K 6/442* (2013.01); *B60W 30/182* (2013.01); *F16H 3/62* (2013.01); *B60Y 2200/91* (2013.01); *B60Y 2200/92* (2013.01); *F16H 2200/201* (2013.01); *F16H 2200/2038* (2013.01)

(58) Field of Classification Search
None
See application file for complete search history.

(56) References Cited

U.S. PATENT DOCUMENTS

| 8,696,507 B2* | 4/2014 | Ziemer | .................... B60K 6/48 475/5 |
| 8,992,362 B2* | 3/2015 | Ziemer | .................. B60K 6/547 475/5 |

* cited by examiner

*Primary Examiner* — Colby M Hansen
(74) *Attorney, Agent, or Firm* — Arent Fox LLP; Michael Fainberg (57) ABSTRACT

The present invention discloses a method for switching modes of an electromechanical transmission system which includes a clutch CL0, a motor A, a clutch CL1, a brake B1, a motor B and three planet rows K1, K2 and K3. The electromechanical transmission system according to the present invention achieves two different structural modes of EVT1 and EVT2 by changing states of the clutch CL0 and the brake B1. The EVT1 mode is mainly a system running state at a low vehicle speed under a high driving torque demand, and the EVT2 mode is mainly a system driving state at a high vehicle speed under a low driving torque demand. Mode switching without speed difference and power interruption can be achieved by switching vehicle speed selection and reasonable adjustment of engine and motor torque.

14 Claims, 4 Drawing Sheets

METHOD FOR SWITCHING MODES OF ELECTROMECHANICAL TRANSMISSION SYSTEM

CROSS-REFERENCE TO RELATED APPLICATIONS

This application claims priority to Chinese Patent Application No. 201910699050.6 filed on Aug. 1, 2019, the entire contents of which is hereby incorporated by reference.

TECHNICAL FIELD

The present invention relates to a transmission system, and in particular to a method for switching modes of an electromechanical transmission system.

BACKGROUD

An electromechanical transmission system in operation may be in two states: a steady state (static) or a variable state (dynamic). A dynamic torque is zero when the system is static, i.e., a drag torque (a torque of a motor) is balanced with a load torque in the system, and the system runs at a constant speed; when the drag torque or the load torque in the system changes, there is the dynamic torque, the system is dynamic, and the speed is changing. The system is about to change from one steady operation state to the other steady operation state, and this process of change is called a transition process. During the transition process, the speed, the torque and a current of the motor change according to a certain law, and they are all functions of time. Starting, braking, speed change and load change and the like of the system can all cause the transition process.

For the convenience of experimental bench design, a coupling mechanism of an existing electromechanical transmission low-power test system does not consider stage change, an operation component such as a clutch necessary for the stage change is not designed, and only performances within stages and coordinated control within the stages are considered.

SUMMARY

The present invention provides a method for switching modes of an electromechanical transmission system so as to solve problems proposed in the background.

To achieve the foregoing objective, the present invention provides the following technical solution:

A method for switching modes of an electromechanical transmission system which includes a clutch CL0, a motor A, a clutch CL1, a brake B1, a motor B and three planet rows K1, K2 and K3, where the method includes the steps of achieving two different structural modes of EVT1 and EVT2 by changing states of the clutch CL0 and the brake B1, where the EVT1 mode is formed when the clutch CL0 is engaged, the clutch CL1 is disengaged, and the brake B1 is engaged; the EVT2 mode is formed when the clutch CL0 is engaged, the clutch CL1 is engaged, and the brake B1 is disengaged; in the EVT1 mode, mechanical power is input through an input shaft and shunted at a planet carrier of the planet row K2; at the planet row K2, a part of the mechanical power directly flows to an output end through a sun gear of the planet row K2, and another part is transmitted to a planet carrier of the planet row K1 through a gear ring of the planet row K2 for shunting; at the planet row K1, a part of the mechanical power flows to the output end through a sun gear of the planet row K1, and another part is transmitted to the motor A through a gear ring of the planet row K1; the motor A is in a power generation state and converts the mechanical power transmitted from an engine into electric power which is transmitted to the motor B through an electrical control system, and the motor B is in an electric state and converts the electric power into mechanical power which is then directly transmitted to an output shaft; in the EVT2 mode, the mechanical power is input from the input shaft and shunted at the planet carrier of the planet row K2; at the planet row K2, a part of the mechanical power is transmitted to the planet carrier of the planet row K1 through the gear ring of the planet row K2 and flows from the planet carrier of the planet row K1 to the output end, and another part is shunted through the sun gear of the planet row K2; at the planet row K1, a part of the mechanical power is transmitted to the planet carrier of the planet row K1 through the sun gear of the planet row K1 and flows to the output end from the planet carrier of the planet row K1, and another part flows to the motor B; and the motor B is in the power generation state and converts the mechanical power into the electric power which is transmitted to the motor A through the electrical control system, and the motor A is in the electric state and converts the electric power into mechanical power which is transmitted to the planet carrier of the planet row K1 through the gear ring of the planet row K1 and then transmitted to the output shaft.

In a further solution of the present invention: in the EVT1 mode, the brake B1 is engaged, the clutch CL1 is disengaged, the planet carrier of the planet row K2 is not connected to the output end, the gear ring of the planet row K1 is connected to the planet carrier of the planet row K2, a gear ring of the planet row K3 is braked, and three sun gears of the planet rows K1, K2, and K3 are connected.

In a further solution of the present invention: in the EVT2 mode, the brake B1 is disengaged, the clutch CL1 is engaged, the planet carrier of the planet row K2 is connected to the output end, and the gear ring of the planet row K3 rotates with a corresponding planet gear.

In a further solution of the present invention: a coupling mechanism speed relationship formula in the EVT1 mode is:

$$\begin{bmatrix} \omega_A \\ \omega_B \end{bmatrix} = \begin{bmatrix} \frac{(1+k_1)(1+k_2)}{k_1 k_2} & -\frac{(1+k_1+k_2)(1+k_3)}{k_1 k_2} \\ 0 & 1+k_3 \end{bmatrix} \begin{bmatrix} \omega_i \\ \omega_o \end{bmatrix},$$

where $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively.

In a further solution of the present invention: a coupling mechanism speed relationship formula in the EVT2 mode is:

$$\begin{bmatrix} \omega_A \\ \omega_B \end{bmatrix} = \begin{bmatrix} -\frac{1+k_2}{k_1} & \frac{1+k_1+k_2}{k_1} \\ 1+k_2 & -k_2 \end{bmatrix} \begin{bmatrix} \omega_i \\ \omega_o \end{bmatrix},$$

where $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively.

In a further solution of the present invention: in the EVT1 mode, a torque of the motor A and an input torque have a fixed proportional relationship, and torque signs are opposite.

In a further solution of the present invention: in the EVT2 mode, the torque signs of the motor A and the motor B are changed compared to those in the EVT1 mode, so that a working state of each motor is changed.

In a further solution of the present invention: in the EVT1 mode and the EVT2 mode, a fixed constraint relationship between an engine speed and the input speed remains unchanged, and the system output speed increases linearly, i.e., stepless change of a transmission ratio of the engine speed to the system output speed is achieved by coordinating the speed of the motor A and the speed of the motor B.

Compared with the prior art, the present invention has the beneficial effects that the electromechanical transmission system achieves two different structural modes of EVT1 and EVT2 by changing states of the clutch CL0 and the brake B1. The EVT1 mode is mainly a system running state at a low vehicle speed under a high driving torque demand, and the EVT2 mode is mainly a system driving state at a high vehicle speed under a low driving torque demand. Mode switching without speed difference and power interruption can be achieved by switching vehicle speed selection and reasonable adjustment of engine and motor torque.

DESCRIPTION OF THE EMBODIMENTS

The following clearly and completely describes the technical solutions in the embodiments of the present invention with reference to accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
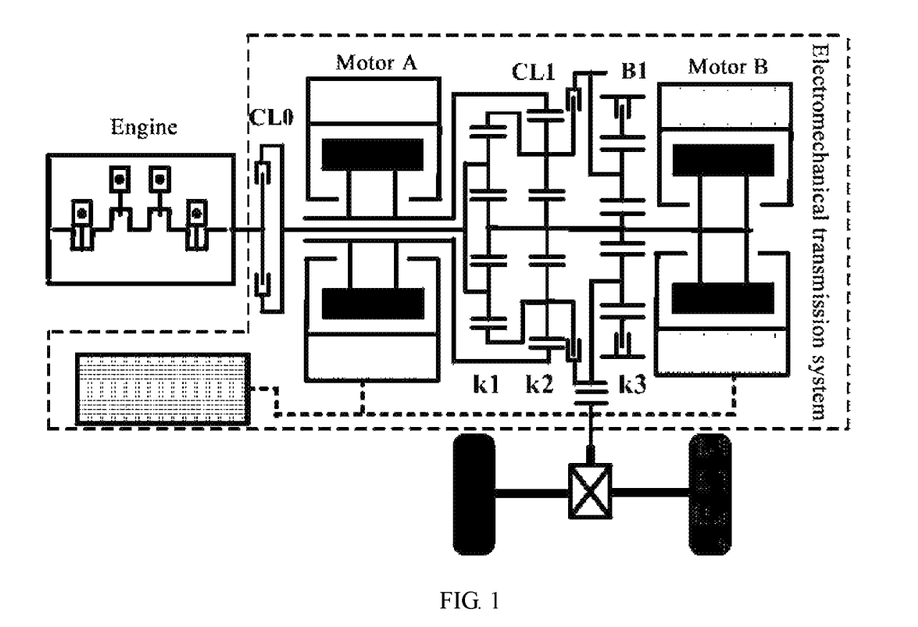
FIG. 1 is a schematic structural diagram of an electromechanical transmission system.

Refer to FIG. 1. A method for switching modes of an electromechanical transmission system is provided. The system includes a clutch CL0, a motor A, a clutch CL1, a brake B1, a motor B and three planet rows K1, K2 and K3. A structure is in a series-parallel structure form. Two different structural modes of EVT1 and EVT2 are achieved by changing states of the clutch CL0 and the brake B1, where the EVT1 mode is formed when the clutch CL0 is engaged, the clutch CL1 is disengaged, and the brake B1 is engaged; and the EVT2 mode is formed when the clutch CL0 is engaged, the clutch CL1 is engaged, and the brake B1 is disengaged.

In the EVT1 mode, the brake B1 is engaged, the clutch CL1 is disengaged, the planet carrier of the planet row K2 is not connected to the output end, and the gear ring of the planet row K1 is connected to the planet carrier of the planet row K2, a gear ring of the planet row K3 is braked, and three sun gears of the planet rows K1, K2, and K3 are connected. The EVT1 mode is mainly a system running state at a low vehicle speed under a high driving torque demand.

In the EVT2 mode, the brake B1 is disengaged, the clutch CL1 is engaged, the planet carrier of the planet row K2 is connected to the output end, and the gear ring of the planet row K3 rotates with a corresponding planet gear. The EVT2 mode is mainly a system driving state at a high vehicle speed under a low driving torque demand.

In order to quantitatively describe operating conditions of the electromechanical transmission system, system states need to be defined. The system states are the smallest set of variables describing a system behavior. In theory, as long as a set of variables at the time $t=t_0$ and an input function at the time $t \geq t_0$ are known, the system behavior at any time $t \geq t_0$ can be completely determined. The system states mainly include a component operating state and a driving operating state. In order to describe the component operating state of the system, engine speed torque $n_e$ and $T_e$, speed torque $n_A$ and $T_A$ of the motor A and speed torque $n_B$ and $T_B$ of the motor B are selected as the system states; in order to describe the driving state of the system, system output speed torque $n_o$ and $T_o$ are selected as the system states.

In the EVT1 mode, the system steady torque relationship is:

$$\begin{bmatrix} T_a \\ T_b \end{bmatrix} = \begin{bmatrix} -\frac{k_1 k_2}{(1+k_1)(1+k_2)} & 0 \\ -\frac{1+k_1+k_2}{(1+k_1)(1+k_2)} & \frac{1}{1+k_3} \end{bmatrix} \begin{bmatrix} T_i \\ T_o \end{bmatrix}.$$

In the EVT2 mode, the system steady torque relationship is:

$$\begin{bmatrix} T_a \\ T_b \end{bmatrix} = \begin{bmatrix} -\frac{k_1 k_2}{(1+k_1)(1+k_2)} & \frac{k_1}{1+k_1} \\ -\frac{1+k_1+k_2}{(1+k_1)(1+k_2)} & \frac{1}{1+k_1} \end{bmatrix} \begin{bmatrix} T_i \\ T_o \end{bmatrix}.$$

In the EVT1 mode and the EVT2 mode, a fixed constraint relationship between an engine speed and the input speed remains unchanged, and the system output speed increases linearly, i.e., stepless change of a transmission ratio of the engine speed to the system output speed is achieved by coordinating the speed of the motor A and the speed of the motor B.

According to a driving power form, the system may fall into three working modes: 1) an engine single driving mode; 2) a motor single driving mode; and 3) an engine and motor common driving mode. In order to describe the vehicle operating conditions in more detail, these three modes may be further subdivided into multiple working states, as shown in Table 2.2. Control methods are different under the different working states, and determining the operating states of the electromechanical transmission system is a prerequisite for system optimization control.

TABLE 2.2

Division of the working states of the electromechanical transmission system

| S/N | State name | Engine | Motor A | Motor B | Description |
|---|---|---|---|---|---|
| 0 | Shutdown | Off | Off | Off | Shutdown |
| 1 | Purely electrically driven | Off | Off | Motor | The motor B drives a vehicle independently. |
| 2 | Mechanical conditions | On | Off | Off | An engine drives the vehicle under emergencies. |
| 2 | EVT1 mode | On | Generator | Motor | The engine and the motors drive the vehicle together. |
| 4 | EVT2 mode | On | Motor | Generator | The engine and the motors drive the vehicle together. |
| 5 | Charging mode | On | Motor/ generator | Motor/ generator | The engine drives the generator to charge a battery while driving the vehicle. |
| 6 | Driving power generation | On | Motor/ generator | Motor/ generator | The engine drives the generator to provide electric energies for electric equipment while driving the vehicle. |
| 7 | Engine start | Start | Off | Off | Engine start |
| 8 | Engine shutdown | Shutdown | Off | Motor | Engine shutdown |

Figure 2:
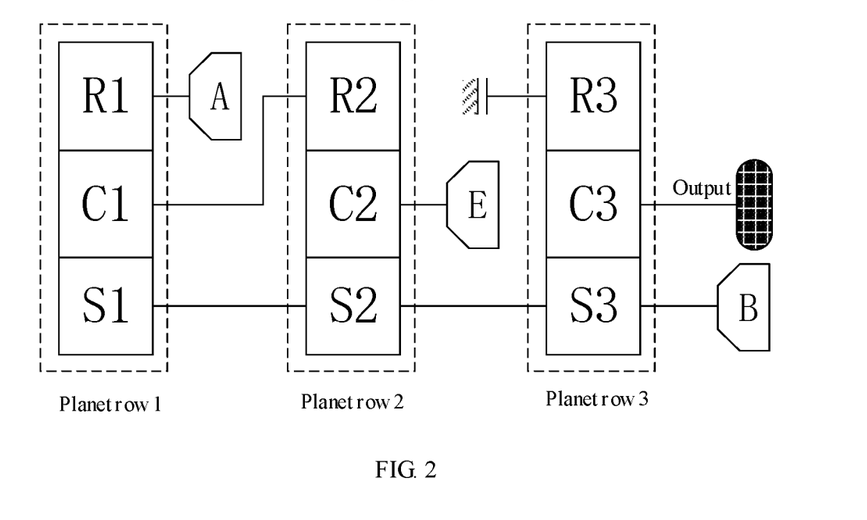
FIG. 2 is a mechanism schematic diagram of an electromechanical transmission system in an EVT1 mode.

According to a basic speed relationship between the planet rows, a coupling mechanism speed relationship formula in the EVT1 mode can be obtained as follows through a system structure shown in FIG. 2:

$$\begin{bmatrix} \omega_A \\ \omega_B \end{bmatrix} = \begin{bmatrix} \frac{(1+k_1)(1+k_2)}{k_1 k_2} & -\frac{(1+k_1+k_2)(1+k_3)}{k_1 k_2} \\ 0 & 1+k_3 \end{bmatrix} \begin{bmatrix} \omega_i \\ \omega_o \end{bmatrix} \quad (2\text{-}1)$$

Figure 3:
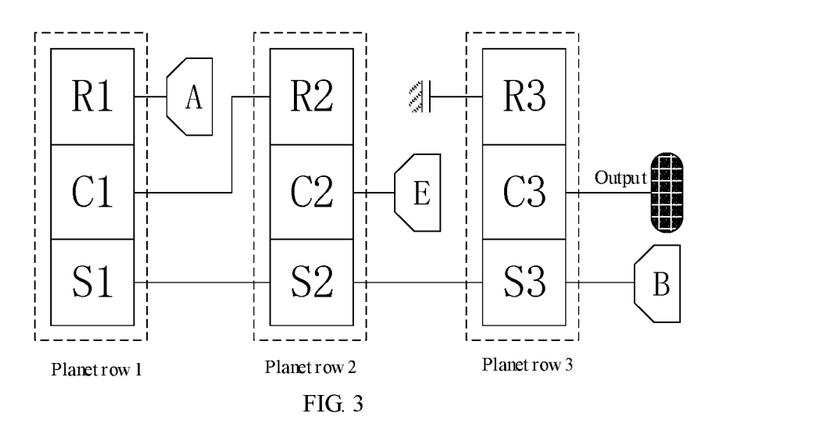
FIG. 3 is a mechanism schematic diagram of an electromechanical transmission system in an EVT2 mode.

In a similar way, a coupling mechanism speed relationship formula in the EVT2 mode can be obtained as follows:

$$\begin{bmatrix} \omega_A \\ \omega_B \end{bmatrix} = \begin{bmatrix} -\frac{1+k_2}{k_1} & \frac{1+k_1+k_2}{k_1} \\ 1+k_2 & -k_2 \end{bmatrix} \begin{bmatrix} \omega_i \\ \omega_o \end{bmatrix} \quad (2\text{-}2)$$

In the formula, $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively. Under dynamic and steady conditions, the system satisfies speed relationships shown in formulas (2-1) and (2-2).

Figure 4:
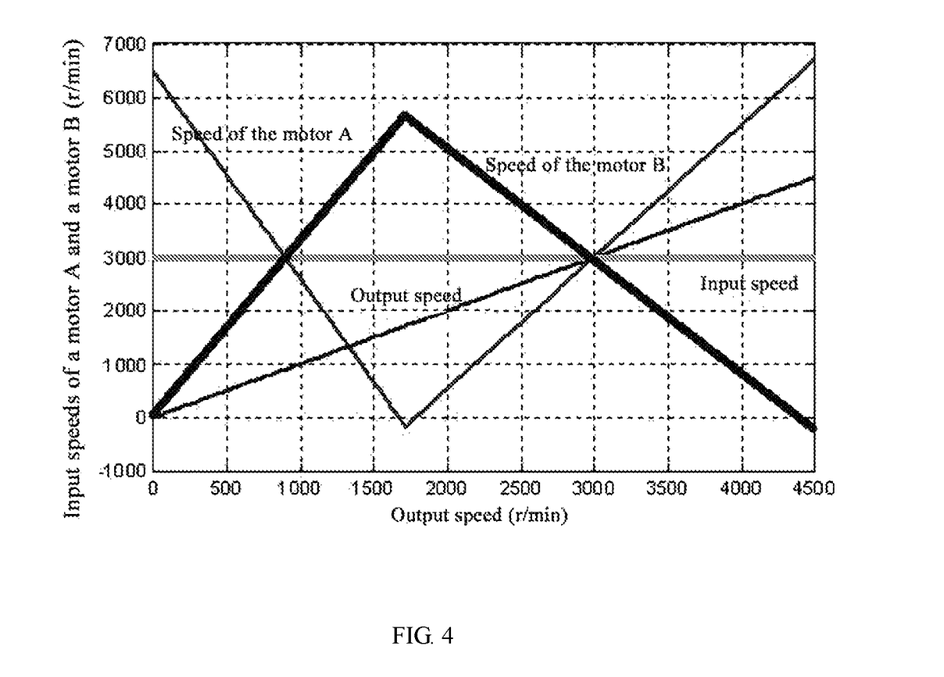
FIG. 4 is a schematic diagram of a speed relationship of an electromechanical transmission system.

The speed relationships of the system can be visualized using FIG. 4.

Figure 5:
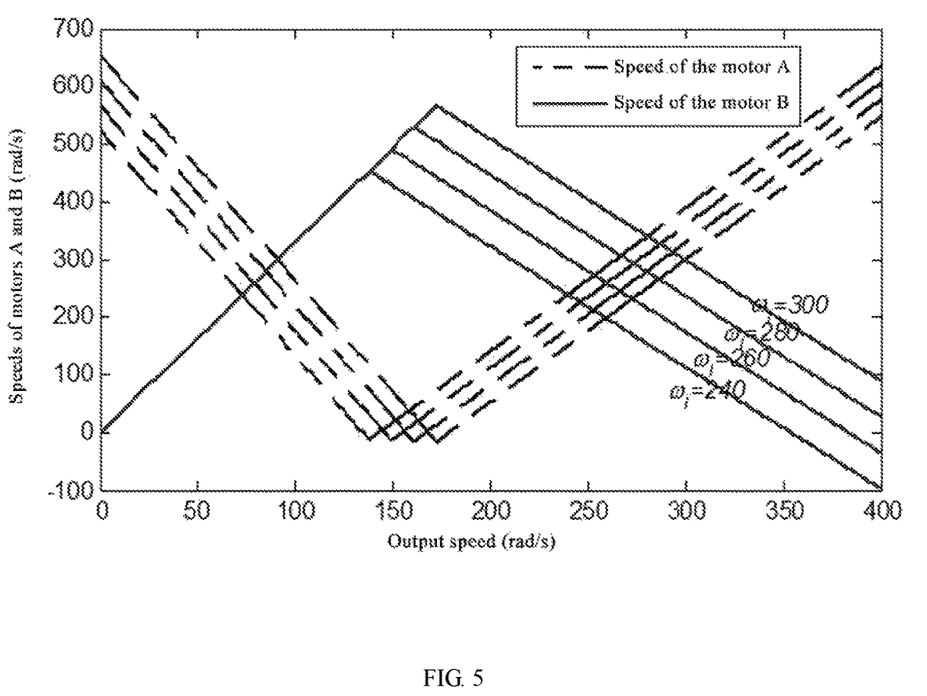
FIG. 5 is a schematic diagram of motor speed changes at different input speeds in different structural modes in an electromechanical transmission system.

As can be seen from the figure, the engine speed and the output speed can be decoupled. When the output speed increases linearly, the engine speed can still be maintained at a steady speed state. Such speed decoupling helps achieve an objective that the engine can be maintained in an efficient operating area under different driving conditions. In the figure, speed trends of the motor A and the motor B change at the same time. Before the change, the system is in the EVT1 mode. After the change, the system is in the EVT2 mode. This change point can be referred to as a mode switching point. The speed at the mode switching point is affected by multiple requirements, such as performance index requirements and clutch speed difference requirements. At the same time, when the engine speed changes, the speed at the mode switching point should also change accordingly, and its changing state is shown in FIG. 5. Reasonably setting the speed at the mode switching point greatly helps improve an overall performance index of the system.

From FIG. 5, it can be concluded that the engine, the motor A and the motor B can have different speed combinations corresponding to the same output speed. In this way, the engine, the motor A and the motor B can be controlled to run within a desired speed range, mainly based on economy, or power, or both. In addition, when the output speed is higher and the engine speed is lower, the desired speed range of the motor A and the motor B is larger. Therefore, in a control strategy, the speed of the motor A and the speed of the motor B should be controlled within a reasonable range.

Components of the electromechanical transmission system transmit torque through mechanical connection, and the speed is adjusted by the torque of the components to achieve the objective of tracking driver instructions of the vehicle. The relationship between the torque of the components is relatively complicated. Under dynamic conditions, the operating states of the system are affected through a dynamic relationship of the system. However, under steady conditions, in order to maintain a current state of the system, the torque between the components must be balanced to meet the steady torque relationship of planet row coupling mechanisms. Under the condition that a system output torque is constant, there can be multiple combinations of motor torque and engine torque to maintain torque balance. Reasonable matching of the torque between the components can play an important role in improving system efficiency and performances. How to allocate such a balanced relationship is a focus of torque management strategy research.

According to a basic torque relationship between the planet rows, a system steady torque relationship in the EVT1 mode can be obtained as follows through a system structure shown in FIG. 2:

$$\begin{bmatrix} T_a \\ T_b \end{bmatrix} = \begin{bmatrix} -\frac{k_1 k_2}{(1+k_1)(1+k_2)} & 0 \\ -\frac{1+k_1+k_2}{(1+k_1)(1+k_2)} & \frac{1}{1+k_3} \end{bmatrix} \begin{bmatrix} T_i \\ T_o \end{bmatrix} \quad (2\text{-}3)$$

A system steady torque relationship in the EVT2 mode can be obtained as follows through a system structure shown in FIG. 3:

$$\begin{bmatrix} T_a \\ T_b \end{bmatrix} = \begin{bmatrix} -\frac{k_1 k_2}{(1+k_1)(1+k_2)} & \frac{k_1}{1+k_1} \\ -\frac{1+k_1+k_2}{(1+k_1)(1+k_2)} & \frac{1}{1+k_1} \end{bmatrix} \begin{bmatrix} T_i \\ T_o \end{bmatrix} \quad (2\text{-}4)$$

Figure 6:
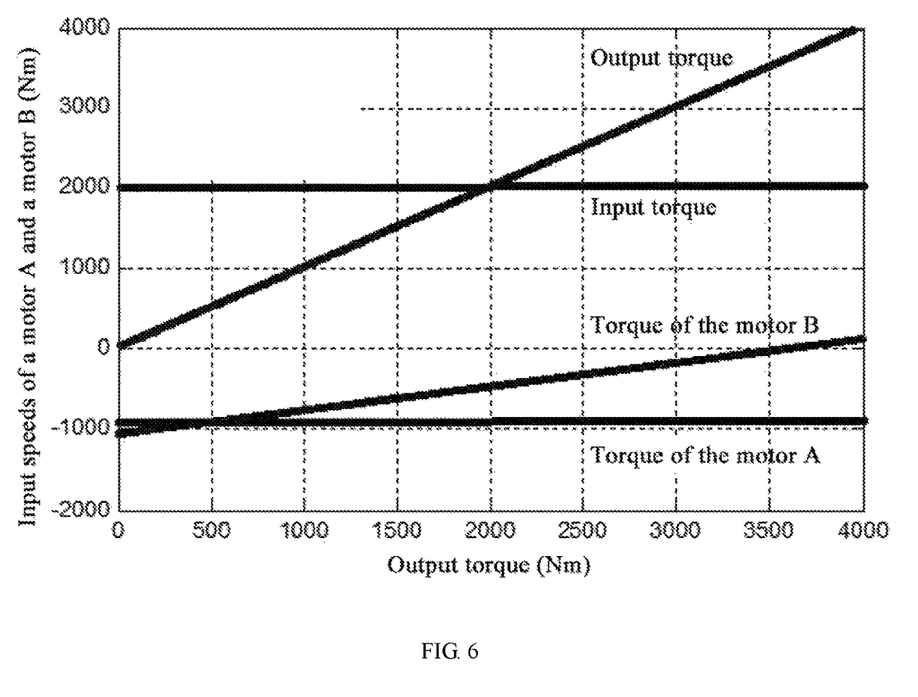
FIG. 6 is a schematic diagram of a system steady torque relationship in an electromechanical transmission system in an EVT1 mode.
Figure 7:
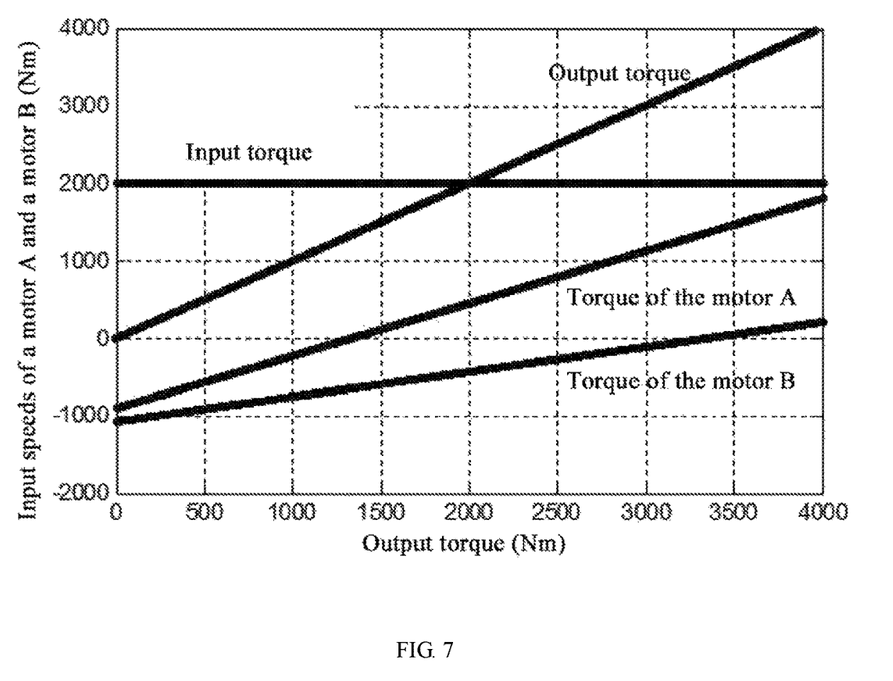
FIG. 7 is a schematic diagram of a system steady torque relationship in an electromechanical transmission system in an EVT2 mode.

The torque relationships of the system can be visualized using FIG. 6 and FIG. 7. From FIG. 6 and FIG. 7, it can be seen that in the EVT1 mode, from a view of a power state, the motor A serves as a load of the system input torque, and the motor B participates in operation of a driving system. In the EVT2 mode, the torque signs of the motor A and the motor B are changed compared to those in the EVT1 mode, so that a working state of each motor is changed. In the two modes, a fixed constraint relationship between the engine speed and the input speed remains unchanged, the system output speed increases linearly, i.e., stepless change of a transmission ratio of the engine speed to the system output speed is achieved by coordinating the speed of the motor A and the speed of the motor B.

By combining external characteristics of the engine and the motors A and B, the steady torque relationships also limit a torque value range of each component in a steady state, which should be considered during a solution process of the control strategy to a steady optimization state point to ensure the accessibility of a given state point.

A power transmission process of the electromechanical transmission system includes multiple ways of power flow which are finally collected at the output end to drive the vehicle. Since the system does not involve an external charging effect, all energy sources are chemical energy of fuels. Through a function of the engine, the chemical energy is converted into mechanical energy. Through a function of the motors and the battery, a part of the mechanical energy is converted into electric energy. Finally, the electric energy and the mechanical energy are converged to the output end and converted into kinetic energy of the vehicle by wheels. The entire transmission process is complicated. Power flow distribution characteristics of the system are analyzed as follows:

According to a steady speed-torque relationship of the system, a torque direction of an engine input speed is positive, and an opposite direction is negative. When the torque direction at a point on a component is the same as a speed direction, a power is positive, indicating an input power. If the torque direction at the point is opposite to the speed direction, the power is negative, indicating an output power.

In the EVT1 mode, mechanical power is input through an input shaft and shunted at a planet carrier of the planet row K2, a part of the mechanical power directly flows to an output end through a sun gear of the planet row K2, and another xpart is transmitted to a planet carrier of the planet row K1 through a gear ring of the planet row K2 for shunting; a part of the mechanical power flows to the output end through a sun gear of the planet row K1, and another part is transmitted to the motor A through a gear ring of the planet row K1; and the motor A is in a power generation state and converts the mechanical power transmitted from an engine into electric power which is transmitted to the motor B through an electrical control system, and the motor B is in an electric state and converts the electric power into mechanical power which is then directly transmitted to an output shaft. In the EVT2 mode, the mechanical power is transmitted from the input shaft and shunted at the planet carrier of the planet row K2; a part of the mechanical power is transmitted to the planet carrier of the planet row K1 through the gear ring of the planet row K2 and flows from the planet carrier of the planet row K1 to the output end, and another part is shunted through the sun gear of the planet row K2; a part of the mechanical power is transmitted to the planet carrier of the planet row K1 through the sun gear of the planet row K1 and flows to the output end from the planet carrier of the planet row K1, and another part flows to the motor B; the motor B is in the power generation state and converts the mechanical power into the electric power which is transmitted to the motor A through the electrical control system, and the motor A is in the electric state and converts the electric power into mechanical power which is transmitted to the planet carrier of the planet row K1 through the gear ring of the planet row K1 and then transmitted to the output shaft.

It is obvious to a person skilled in the art that the present invention is not limited to details of the exemplary embodiments, and the present invention can be implemented in other specific forms without departing from spirits or basic features of the present invention. Therefore, the embodiments should be regarded as being exemplary and nonrestrictive in every respect, and the scope of the present invention is defined by the appended claims rather than the above description. Therefore, all changes within meanings and scopes of equivalent elements of the claims are intended to be incorporated into the present invention. No reference signs in the claims should be construed as limiting the claims involved.

In addition, it should be understood that although this specification is described according to implementations, not every embodiment includes only one independent technical solution. This description of the specification is for clarity only, and those skilled in the art should take the specification as a whole. The technical solutions in the embodiments can also be appropriately combined to form other implementations that can be understood by those skilled in the art.

The invention claimed is:

1. A method for switching modes of an electromechanical transmission system which comprises a clutch CL0, a motor A, a clutch CL1, a brake B1, a motor B and three planet rows K1, K2 and K3, comprising the steps of achieving two different structural modes of EVT1 and EVT2 by changing states of the clutch CL0 and the brake B1, wherein the EVT1 mode is formed when the clutch CL0 is engaged, the clutch CL1 is disengaged, and the brake B1 is engaged; the EVT2 mode is formed when the clutch CL0 is engaged, the clutch CL1 is engaged, and the brake B1 is disengaged; in the EVT1 mode, mechanical power is input through an input shaft and shunted at a planet carrier of the planet row K2; at the planet row K2, a part of the mechanical power directly flows to an output end through a sun gear of the planet row K2, and another part is transmitted to a planet carrier of the planet row K1 through a gear ring of the planet row K2 for shunting; at the planet row K1, a part of the mechanical power flows to the output end through a sun gear of the planet row K1, and another part is transmitted to the motor A through a gear ring of the planet row K1; the motor A is in a power generation state and converts the mechanical power transmitted from an engine into electric power which is transmitted to the motor B through an electrical control system, and the motor B is in an electric state and converts the electric power into mechanical power which is then directly transmitted to an output shaft; in the EVT2 mode, the mechanical power is input from the input shaft and shunted at the planet carrier of the planet row K2; at the planet row K2, a part of the mechanical power is transmitted to the planet carrier of the planet row K1 through the gear ring of the planet row K2 and flows from the planet carrier of the planet row K1 to the output end, and another part is shunted through the sun gear of the planet row K2; at the planet row K1, a part of the mechanical power is transmitted to the planet carrier of the planet row K1 through the sun gear of the planet row K1 and flows to the output end from the planet carrier of the planet row K1, and another part flows to the motor B; and the motor B is in the power generation state and converts the mechanical power into the electric power which is transmitted to the motor A through the electrical control system, and the motor A is in the electric state and converts the electric power into mechanical power which is transmitted to the planet carrier of the planet row K1 through the gear ring of the planet row K1 and then transmitted to the output shaft.

2. The method for switching modes of an electromechanical transmission system according to claim 1, wherein in the EVT1 mode, the brake B1 is engaged, the clutch CL1 is disengaged, the planet carrier of the planet row K2 is not connected to the output end, the gear ring of the planet row K1 is connected to the planet carrier of the planet row K2, a gear ring of the planet row K3 is braked, and three sun gears of the planet rows K1, K2, and K3 are connected.

3. The method for switching modes of an electromechanical transmission system according to claim 2, wherein in the EVT2 mode, the brake B1 is disengaged, the clutch CL1 is engaged, the planet carrier of the planet row K2 is connected to the output end, and the gear ring of the planet row K3 rotates with a corresponding planet gear.

4. The method for switching modes of an electromechanical transmission system according to claim 3, wherein a coupling mechanism speed relationship formula in the EVT1 mode is:

$$\begin{bmatrix} \omega_A \\ \omega_B \end{bmatrix} = \begin{bmatrix} \frac{(1+k_1)(1+k_2)}{k_1 k_2} & -\frac{(1+k_1+k_2)(1+k_3)}{k_1 k_2} \\ 0 & 1+k_3 \end{bmatrix} \begin{bmatrix} \omega_i \\ \omega_o \end{bmatrix},$$

wherein $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively.

5. The method for switching modes of an electromechanical transmission system according to claim 4, wherein a coupling mechanism speed relationship formula in the EVT2 mode is:

$$\begin{bmatrix} \omega_A \\ \omega_B \end{bmatrix} = \begin{bmatrix} -\frac{1+k_2}{k_1} & \frac{1+k_1+k_2}{k_1} \\ 1+k_2 & -k_2 \end{bmatrix} \begin{bmatrix} \omega_i \\ \omega_o \end{bmatrix},$$

wherein $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively.

6. The method for switching modes of an electromechanical transmission system according to claim 5, wherein in the EVT1 mode, a torque of the motor A and an input torque have a fixed proportional relationship, and torque signs are opposite.

7. The method for switching modes of an electromechanical transmission system according to claim 6, wherein in the EVT2 mode, the torque signs of the motor A and the motor B are changed compared to those in the EVT1 mode, so that a working state of each motor is changed.

8. The method for switching modes of an electromechanical transmission system according to claim 7, wherein in the EVT1 mode and the EVT2 mode, a fixed constraint relationship between an engine speed and the input speed remains unchanged, and the system output speed increases linearly, i.e., stepless change of a transmission ratio of the engine speed to the system output speed is achieved by coordinating the speed of the motor A and the speed of the motor B.

9. The method for switching modes of an electromechanical transmission system according to claim 1, wherein in the EVT2 mode, the brake B1 is disengaged, the clutch CL1 is engaged, the planet carrier of the planet row K2 is connected to the output end, and the gear ring of the planet row K3 rotates with a corresponding planet gear.

10. The method for switching modes of an electromechanical transmission system according to claim 9, wherein a coupling mechanism speed relationship formula in the EVT1 mode is:

$$\begin{bmatrix} \omega_A \\ \omega_B \end{bmatrix} = \begin{bmatrix} \frac{(1+k_1)(1+k_2)}{k_1 k_2} & -\frac{(1+k_1+k_2)(1+k_3)}{k_1 k_2} \\ 0 & 1+k_3 \end{bmatrix} \begin{bmatrix} \omega_i \\ \omega_o \end{bmatrix},$$

wherein $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively.

11. The method for switching modes of an electromechanical transmission system according to claim 10, wherein a coupling mechanism speed relationship formula in the EVT2 mode is:

$$\begin{bmatrix} \omega_A \\ \omega_B \end{bmatrix} = \begin{bmatrix} -\frac{1+k_2}{k_1} & \frac{1+k_1+k_2}{k_1} \\ 1+k_2 & -k_2 \end{bmatrix} \begin{bmatrix} \omega_i \\ \omega_o \end{bmatrix},$$

wherein $\omega_A$, $\omega_B$, $\omega_i$, $\omega_o$ are a speed of the motor A, a speed of the motor B, a system input speed and a system output speed respectively; and $k_1$, $k_2$, $k_3$ are characteristic parameters of the planet rows K1, K2, and K3 respectively.

12. The method for switching modes of an electromechanical transmission system according to claim 11, wherein in the EVT1 mode, a torque of the motor A and an input torque have a fixed proportional relationship, and torque signs are opposite.

13. The method for switching modes of an electromechanical transmission system according to claim 12, wherein in the EVT2 mode, the torque signs of the motor A and the motor B are changed compared to those in the EVT1 mode, so that a working state of each motor is changed.

14. The method for switching modes of an electromechanical transmission system according to claim 13, wherein in the EVT1 mode and the EVT2 mode, a fixed constraint relationship between an engine speed and the input speed remains unchanged, and the system output speed increases linearly, i.e., stepless change of a transmission ratio of the engine speed to the system output speed is achieved by coordinating the speed of the motor A and the speed of the motor B.

\* \* \* \* \*